United States Patent [19]
Koo et al.

[11] Patent Number: 5,842,358
[45] Date of Patent: Dec. 1, 1998

[54] POWER SYSTEM OF CLOTHES WASHING MACHINE

[75] Inventors: Hyoung-Mo Koo, Anyang; Min-Soo Lee, Uiwang, both of Rep. of Korea

[73] Assignee: Samsung Electronics Co., Ltd., Suwon, Rep. of Korea

[21] Appl. No.: 870,905

[22] Filed: Jun. 6, 1997

[30] Foreign Application Priority Data

Jun. 12, 1996 [KR] Rep. of Korea .................. 1996 21109

[51] Int. Cl.⁶ .................................................. D06F 37/40
[52] U.S. Cl. ............................................................ 68/23.7
[58] Field of Search ..................... 68/23.6, 23.7

[56] References Cited

U.S. PATENT DOCUMENTS

| | | | |
|---|---|---|---|
| 2,609,697 | 9/1952 | Ruscoe | 68/23.7 X |
| 2,610,498 | 9/1952 | Geldhof et al. | 68/23.7 |
| 2,826,056 | 3/1958 | Bruckman | 68/23.7 |
| 4,291,556 | 9/1981 | Mason | 68/23.7 |
| 4,969,341 | 11/1990 | Burk et al. | 68/23.7 |
| 5,586,455 | 12/1996 | Imai et al. | 68/23.7 X |

*Primary Examiner*—Philip R. Coe
*Attorney, Agent, or Firm*—Burns, Doane, Swecker & Mathis, L.L.P.

[57] ABSTRACT

A clothes washing machine includes a water tub, a spin basket, and a clothes agitator. A vertical dehydrating shaft is fixed to the spin basket, and a laundering shaft extends coaxially within the dehydrating shaft. Upper and lower ends of the laundering shaft are connected to the agitator and a motor respectively, whereby rotation of the motor is always transmitted to the agitator. In order to selectively connect the dehydrating shaft to the laundering shaft (e.g., during a spin-drying operation), a connecting gear is mounted on the dehydrating shaft for rotation therewith and for vertical movement relative thereto. A power-driven actuator is provided for selectively moving the connecting gear up or down. When the connecting gear moves down, lower teeth thereon become operably connected to the motor so that the dehydrating shaft and laundering shaft rotate together. During a washing or rinsing operation, the connecting gear is moved up, whereby upper teeth thereon become connected to a fixed element, whereby the dehydrating shaft is fixed against rotation.

7 Claims, 6 Drawing Sheets

POWER SYSTEM OF CLOTHES WASHING MACHINE

BACKGROUND OF THE INVENTION (1) Field of the Invention

The present invention relates to a power system of a washing machine and, more particularly, to a power system of a washing machine which can suppress a rotation of a rotating drum during a washing operation and rotate the rotating drum at a high speed during a dehydrating or spin drying operation.

(2) Description of the Related Art

Generally, a washing machine includes a main body defining an outer configuration thereof, a water reserving drum or water tub installed within the body, and rotating drum or spin basket and agitator blade mounted within the water reserving drum. A power system for driving the rotating drum and blade is mounted under the water reserving drum.

The power system conventionally comprises a motor, a power transmission system, and a belt for connecting the motor to the power transmission system. This will be described hereinbelow with reference to FIG. 6.

Figure 6:
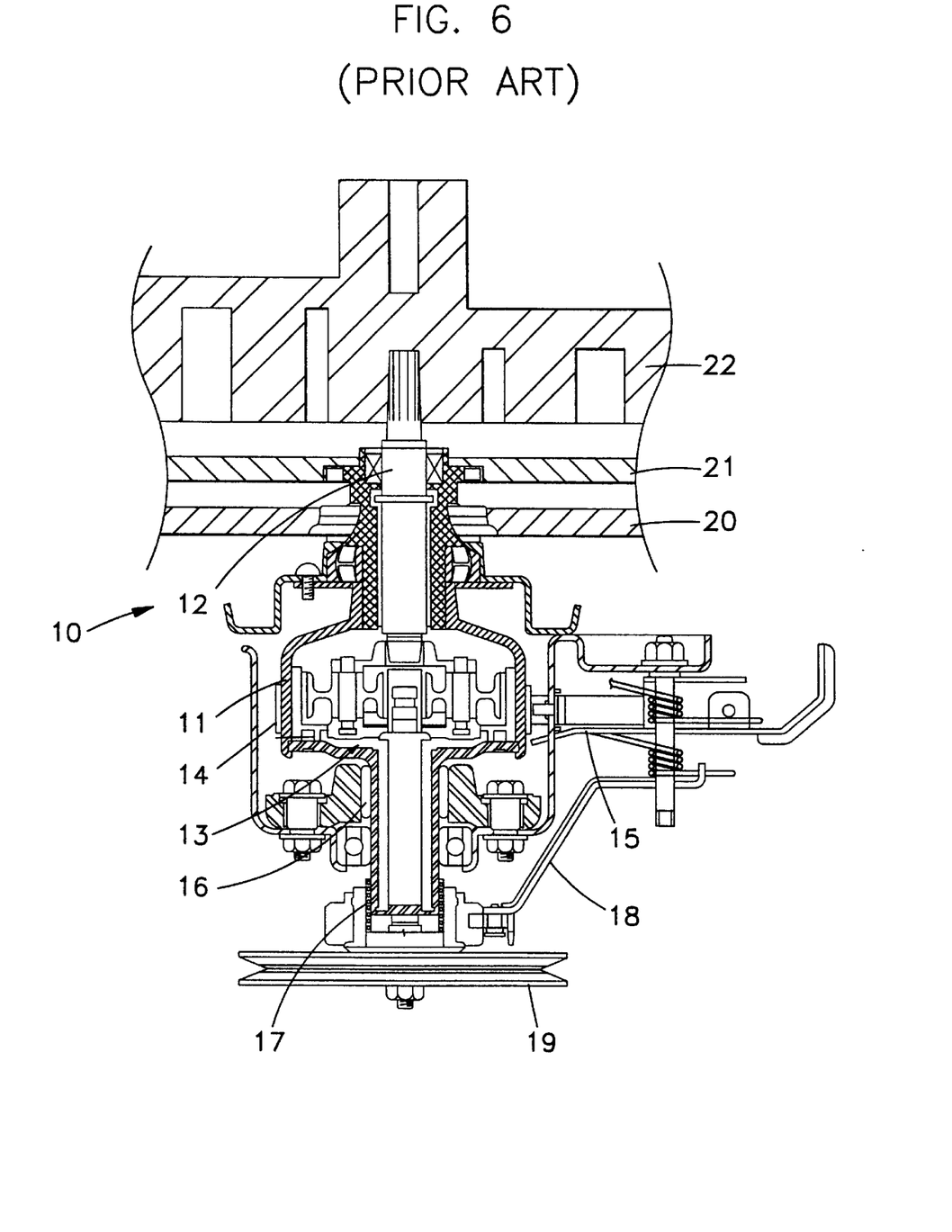
FIG. 6 is a vertical sectional view of a conventional power transmission system of a washing machine.

As shown in drawing, a conventional power transmission system 10 has a hollow dehydrating shaft 11 and a laundering shaft 12 inserted into the hollow portion of the hollow dehydrating shaft 11. The laundering shaft 12 is divided into upper and lower portions, with a planetary gear unit 13 being disposed therebetween. The planetary gear unit 13 controls a rotating speed. A brake band 14 and a brake lever 15 are disposed beside the dehydrating shaft 11 so as to brake the rotation of the dehydrating shaft 11. A one-way bearing 16, for suppressing an idling rotation of a rotating drum 21 by cooperating with the brake band 14 and allowing the dehydrating shaft 11 to rotate in only one direction, is mounted on an outer circumference of the dehydrating shaft 11. In addition, a clutch spring 17 and a clutch lever 18 for transmitting/interrupting power from the motor to both the dehydrating shaft 11 and the laundering shaft 12 are mounted under the one-way bearing 16. A pulley 19 on which a belt (not shown) is engaged is mounted on a lower end of the laundering shaft 12.

In this conventional power transmission system 10, torque of the motor is selectively transmitted to the rotating blade 22 or the rotating drum 21 through the clutch spring 17, thereby performing the washing and dehydrating (spin drying) operations. To achieve this, it is necessary that the clutch spring 17 has high tensile strength to enable the transmission or interruption of torque from the motor to the dehydrating shaft 11 and the laundering shaft 12, both of which are rotated at a high speed. However, the manufacturing process for such a spring having high tensile strength is complicated, and, as a result, manufacturing costs are increased.

In addition, the brake band 14 for preventing the rotating drum 21 from idling during the washing operation is, when it brakes the rotating drum 21 in one direction, subjected to high force generated when the rotating drum 21 is urged to rotate by a water current within the water reserving drum. The above described one-way bearing 16 must be used as a result, making the structure complicated and increasing manufacturing costs. Finally, an unpleasant noise is generated during the braking operation of the brake band.

As described above, the conventional power system of a washing machine is complicated with regard to the arrangement of parts for performing the washing, dehydrating and braking operations, making it difficult to manufacture the same and increasing manufacturing costs. In addition, because of the large number of parts needed for this complicated arrangement, much space is required which, in turn, acts to increase the overall size of the washer.

SUMMARY OF THE INVENTION

Therefore, the present invention is made in an effort to solve the above described problems.

It is an object of the present invention to provide a washing machine having a power system which is easy to manufacture by integrally connecting the power transmission system to a drive motor.

It is another object of the present invention to provide a washing machine which can minimize the noise generated during operation.

To achieve the above objects, the present invention provides a washing machine, comprising a water reserving drum for reserving water therein, a rotating drum mounted inside the water reserving drum, a rotating blade assembly mounted on an inner bottom surface of the rotating drum, a reversible motor mounted under the water reserving drum, a hollow dehydrating shaft having an upper end coupled to the rotating drum and a lower end extending outside the water reserving drum, and a laundering shaft inserted into the hollow dehydrating shaft such that the laundering shaft extends out of the upper and lower ends of the hollow dehydrating shaft, the laundering shaft having an upper end coupled to the rotating blade assembly and a lower end coupled to the motor, a coupling member coupled on an outer circumference of the lower end of the laundering shaft so as to rotate therewith, a connecting member mounted on the dehydrating shaft to be ascendable/descendible along a longitudinal axis of the dehydrating shaft, the connecting member allowing, when ascended, the laundering shaft to rotate by itself and, when descended, the laundering and dehydrating shafts to rotate by coupling to the coupling member, and means for raising and lowering the connecting member.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
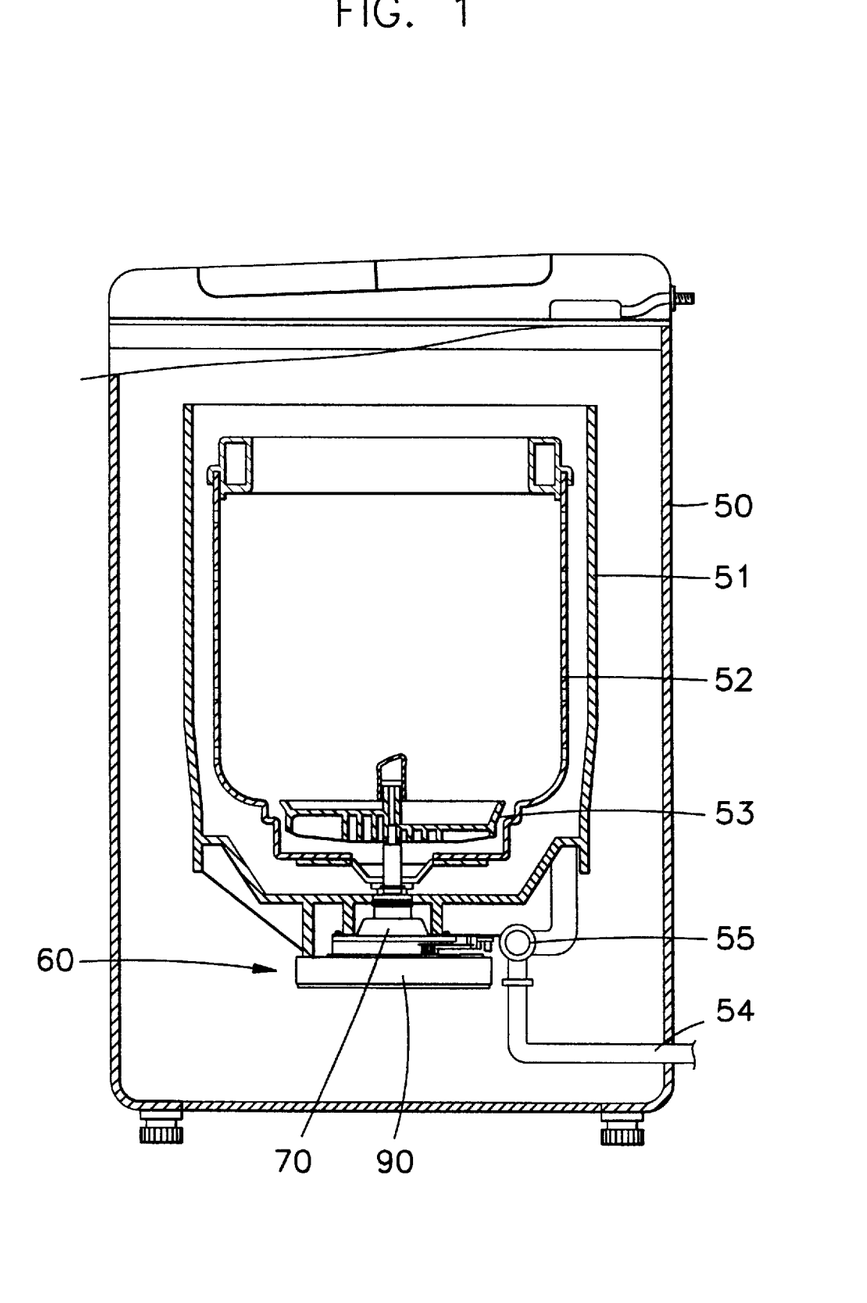
FIG. 1 is a vertical sectional view illustrating a washing machine where a power system according to the present invention is installed.

Referring first to FIG. 1, the inventive washing machine comprises a main body 50 defining an outer configuration thereof and a water reserving drum or water tub 51 installed inside the main body 50 which holds water. A rotating drum or spin basket 52, inside of which laundry is washed, is provided inside the water reserving drum 51. Installed above a bottom surface of the rotating drum 52 is a rotating agitator blade assembly 53 which rotates in forward and reverse directions so as to generate water currents.

A power system 60, for driving the rotating blade assembly 53 and the rotating drum 52, is installed under the water reserving drum 51. Here, the power system 60 comprises a reversible motor 90 and a power transmission system 70, which transmits a rotating force of the reversible motor 90 to the rotating blade assembly 53 or the rotating reservoir 52.

In addition, a drain hose 54 is mounted on the right side (in the drawing) of the power system 60, the drain hose 54 draining the water in the water reserving drum 51 out of the main body 50. A drain valve 55 for opening/closing the drain hose 54 is mounted on the drain hose 54. A drain motor (not shown) which controls the operation of the drain valve 55 and the power transmission system 70, is mounted between the drain valve 55 and the power transmission system 70.

Figure 2:
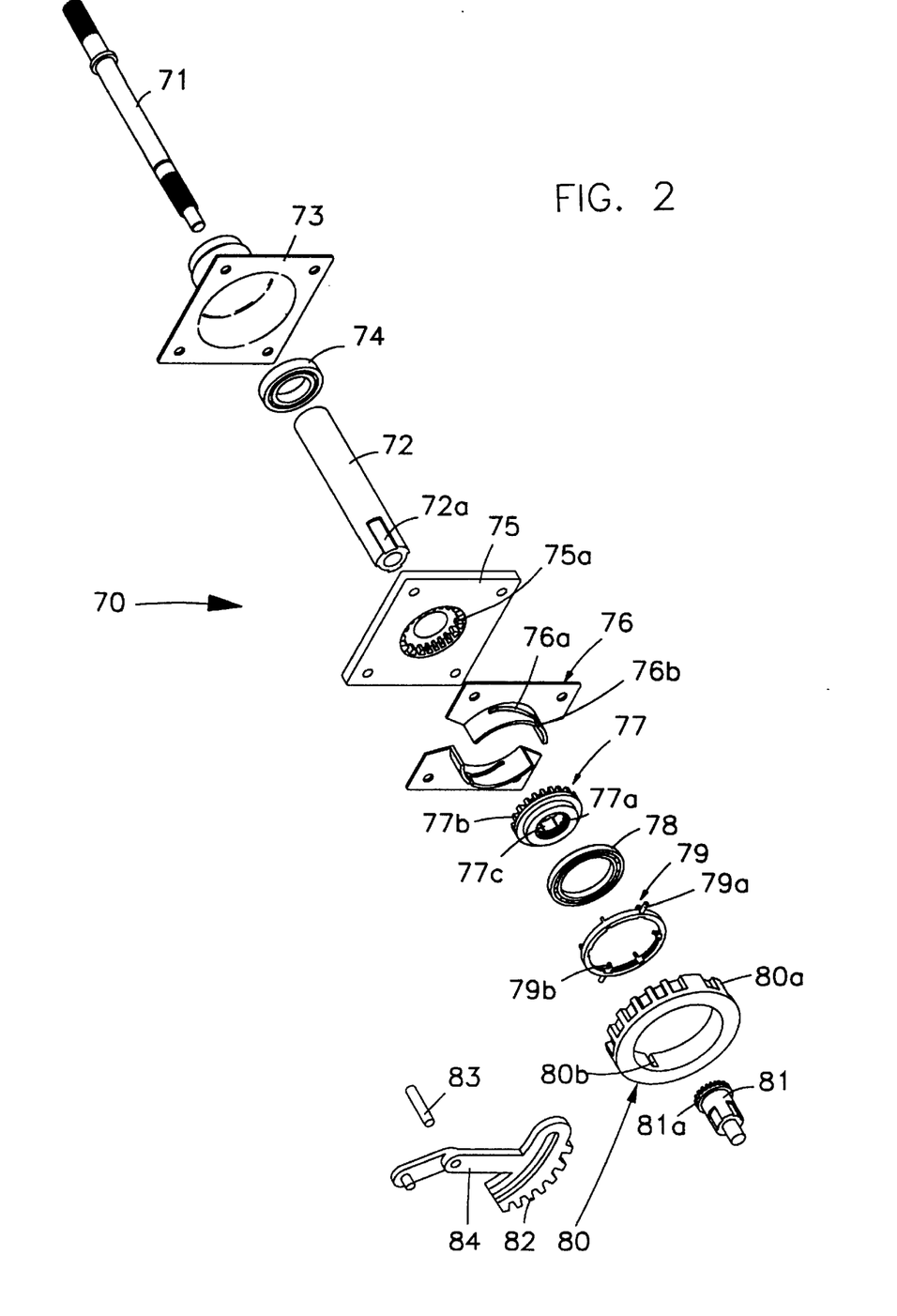
FIG. 2 is an exploded perspective view of a power system according to a first preferred embodiment of the present invention.

The power transmission system 70 of the power system 60 is coupled at its upper portion to the rotating drum 52, and, as shown in FIG. 2, is provided at its lower portion with a hollow dehydrating shaft 72 which is passing through a bottom surface of the water reserving drum 51. There is further provided a cylindrical supporting plate 73 which is coupled on an inner bottom surface of the water reserving drum 51 so that the dehydrating shaft 72 can be supportably coupled thereon. Here, a bearing 74 is disposed between the supporting plate 73 and the dehydrating shaft 72 so that the dehydrating shaft 72 coupled to the supporting plate 73 can freely rotate.

Figure 3:
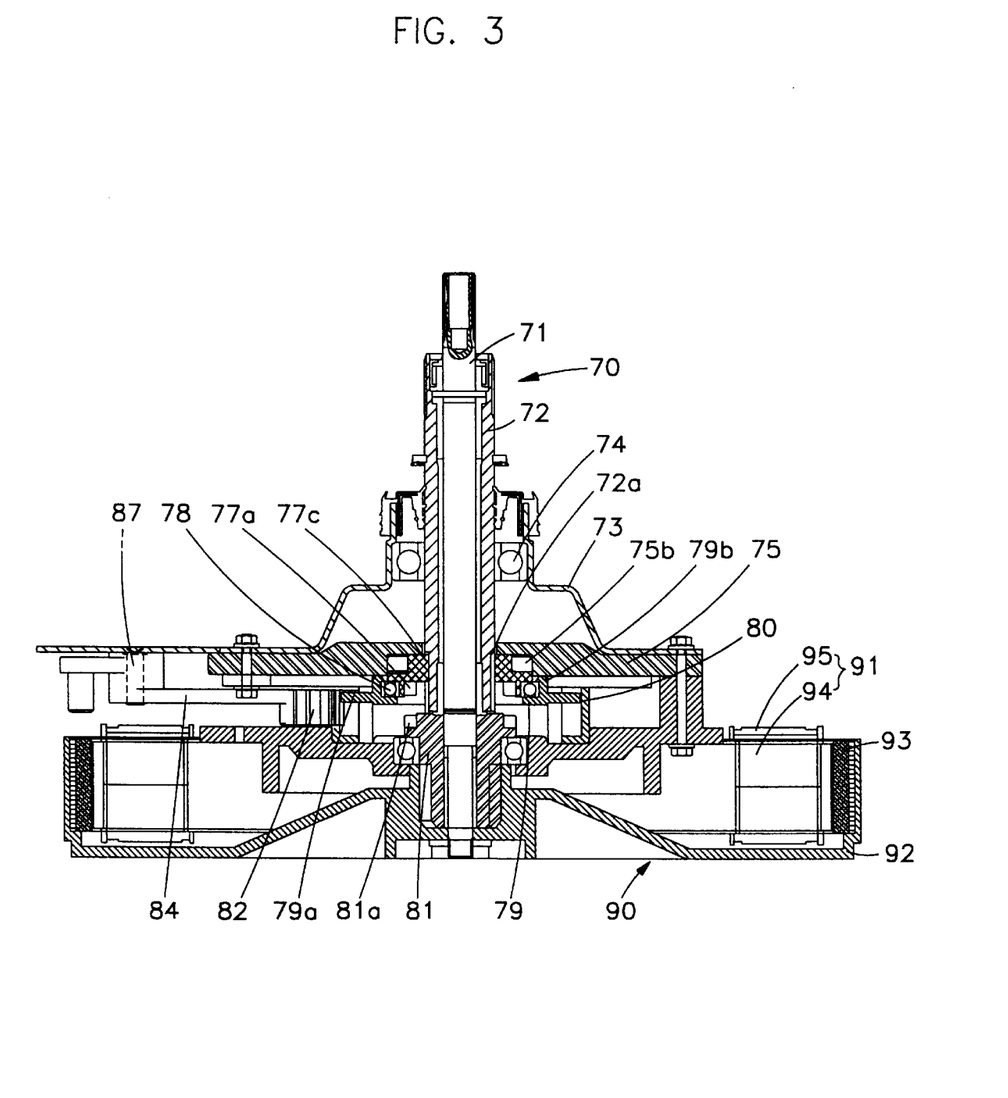
FIG. 3 is a vertical sectional view showing the power system of FIG. 2 during a washing operation of the washing machine.

Inserted into the dehydrating shaft 72 is a laundering shaft 71, an upper end of which is coupled to the rotating blade assembly 53 and a lower end of which is coupled to a rotor 92 of the reversible motor 90 (see FIG. 3). Both ends of the laundering shaft 71 are serrated to allow for the coupling to the rotating blade assembly 53 and the reversible motor 90. Inserted around the dehydrating shaft 72 is a ring-shaped connecting gear 77 which can ascend and descend along the dehydrating shaft 72. After the connecting gear 77 descends along the dehydrating shaft 72, the dehydrating shaft 72 rotates together with the laundering shaft 71, and after the connecting gear ascends, the laundering shaft rotates by itself.

That is, a coupling gear 81 which is designed to integrally rotate with the reversible motor 90 is integrally mounted on a lower end of the laundering shaft 71 so that when the connecting gear 77 descends it can mesh with the coupling gear 81.

The connecting gear 77 is provided at its inner lower circumference with inner teeth 77a, and at its outer upper circumference with outer teeth 77b. A plurality of projections 77c are formed on an upper portion of the inner teeth 77a. The projections 77c are designed to be inserted into corresponding coupling grooves 72a, which extend along a portion of the dehydrating shaft 72 where the connecting gear 77 is coupled, so as to allow the connecting gear 77 to slide upward and downward along the coupling grooves 72a.

In addition, the coupling gear 81 is provided on its outer upper portion with outer teeth 81a which are designed to mesh with the inner teeth 77a of the connecting gear 77 when the same descends.

Mounted on an under surface of the water reserving drum 51 is a fixing plate 75. The fixing plate 75 is provided with inner teeth 75a which, after the connecting gear 77 ascends, mesh with the outer teeth 77b of the connecting gear 77 so as to restrict the rotation of the dehydrating shaft 72.

For the above operation, the connecting gear 77 is raised and lowered along the grooves 72a of the dehydrating shaft 72 by ascending/descending means which will be described more in detail hereinafter.

The ascending/descending means comprises an ascending/descending guide member 76 which is coupled to the fixing plate 75 by fastener means such as bolts or screws (not shown). The guide member 76 is comprised of two pieces separated symmetrically. A semi-circular ascending/descending guide plate 76b extends from each proximal end of the plates. An inclined ascending/descending guide slit 76a which has an opened lower end is formed on the ascending/descending guide plate 76b.

The ascending/descending means further comprises an ascending/descending ring 79 on which ascending/descending projections 79a are formed. The ascending/descending ring 79 is engaged with a stepped portion of the connecting gear 77. A bearing 78 is interposed between the connecting gear 77 and the ascending/descending ring 79. The bearing 78 prevents rotating force from being transmitted to the ascending/descending ring 79 even when the connecting gear 77 rotates. The bearing 78 is designed to be fixed by a plurality of fixing steps 79b. The projections 79a are respectively formed on diametrically opposite sides of the ascending/descending ring 79.

As described above, the ascending/descending ring 79 is designed to guide the ascending/descending operation of the connecting gear 77 while ascending and descending along the ascending/descending guide slits 76a. For this operation, a ring-shaped ascending/descending gear 80 is connected to free ends of the ascending/descending projections 79a.

The ascending/descending gear 80 is provided with outer teeth 80a at an outer circumference thereof, and is provided on its inner circumference with circumferentially opposed slots 80b into which the projections 79a are inserted.

In addition, the outer teeth 80a of the ascending/descending gear 80 mesh with a rotating gear 82 for rotating the ascending/descending gear 80. A connecting bar 84 is articulated on the rotating gear 82 by a connecting pin 83. Rotating force of a drain motor (not shown) is transmitted to the connecting bar 84, thereby driving the rotating gear 82.

As described above, the ring-shaped ascending/descending gear 80, the ascending/descending ring 79, and the connecting gear 77 are disposed in this order, thereby raising and lowering the connecting gear 77 when a driving force of the rotating gear 82 is applied.

As shown in FIG. 3, the driving motor of the power system 60 is a brushless DC motor comprised of a rotor 92 and a stator 91 disposed inside the rotor 92. The coupling gear 81 engaged with the laundering shaft 71 of the power transmission system 70 is coupled on a central portion of the rotor 92. Magnets 93 are mounted along an inner circumference of the rotor 92. The stator 91 is comprised of a core 94 facing the magnets 93 and a coil 95 wound around the core 94 so that the rotor 92 is driven by electromagnetic force generated between the core 95 of the stator 91 and the magnet 93 of the rotor 92 by electric current applied to the coil 95.

The operation of the above described power system 60 of the washing machine according to the present invention will be described hereinafter.

A washing operation will be first described with reference to FIG. 3. The rotating gear 82 is rotated by the drain motor (not shown) which is driven by initial input current. By the rotation of the rotating gear 82, the ascending/descending gear 80 rotates, making the ascending/descending projections 79a rotate. The projections 79a ascend along the guide slits 76a of the guide member 76 such that the ring 79 ascends. As a result, the connecting gear 77 ascends along the projections 72a of the dehydrating shaft 72 without rotating so that the outer teeth 77b of the connecting gear 77 become fixed by meshing with the inner teeth 75a of the fixing plate 75.

In the above state, the laundry is placed in the rotating drum 52 and the water is fed to the water reserving drum 51, whereupon electric current is applied to the motor 90, so that the rotor 92 of the motor 90 rotates in the forward and reverse directions. Here, the laundering shaft 71 and the coupling gear 81 rotate with the rotation of the motor 90, thereby rotating the rotating blade assembly 53 coupled to the laundering shaft 71 and performing the washing/rinsing operation.

When the washing/rinsing operation is finished, the water reserved within the water reserving drum 51 is drained by the opening of the drain valve 55 by the drain motor (not shown).

After the water is completely drained, the dehydrating operation is performed in a state where the drain valve 55 is opened. The operation of the power system 60 during the dehydrating stroke will be described hereinafter with reference to FIG. 4.

Figure 4:
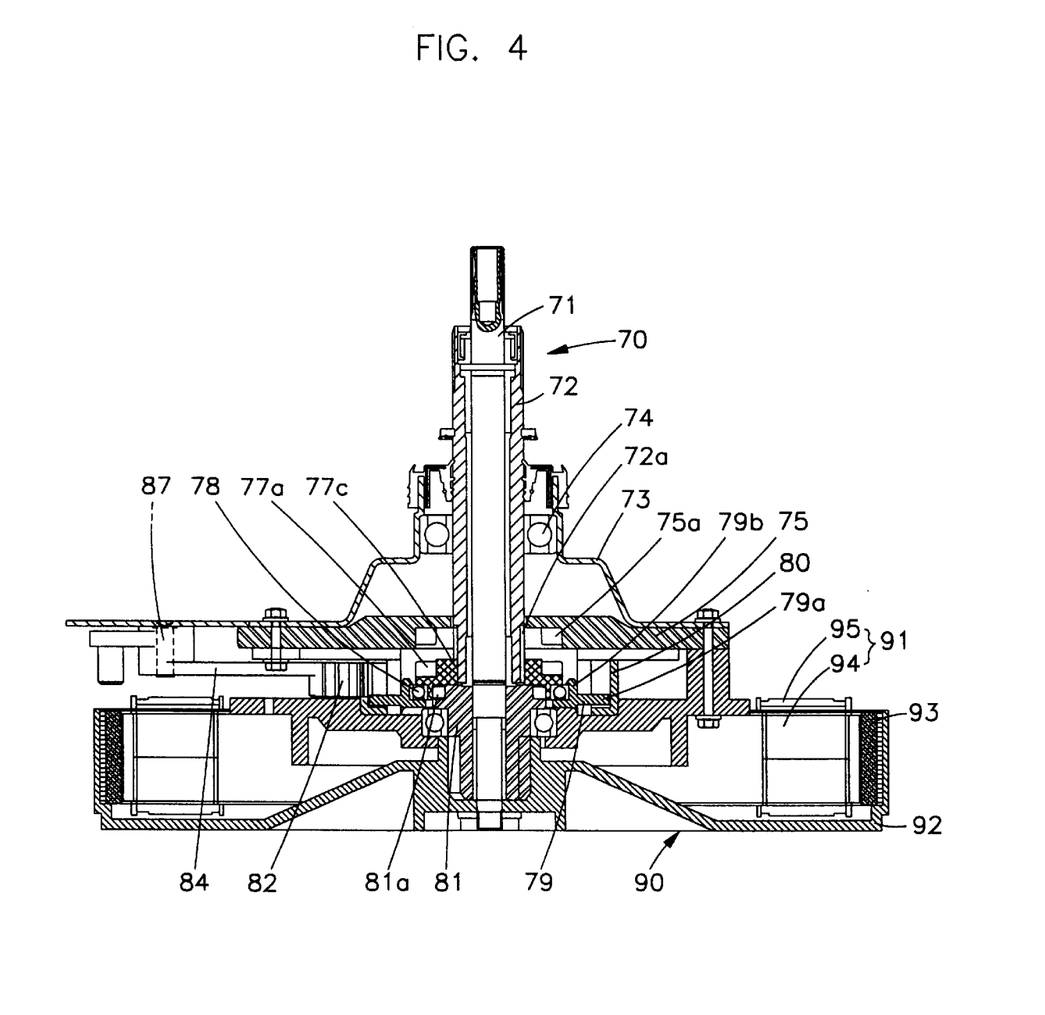
FIG. 4 is a vertical sectional view showing the power system of FIG. 2 during a dehydrating operation of the washing machine.

When the drain valve 55 is opened by the drain motor, the power transmission system 70 changes to a dehydrating driving state. That is, when the drain motor is operated, the drain valve 55 is opened, and at the same time, the rotating gear 82 rotates the ascending/descending gear 80. By the rotation of the ascending/descending gear 80, the projections 79a descend along the ascending/descending guide slits 76a of the ascending/descending guide assembly 76, thereby lowering the ascending/descending ring 79. As a result, the connecting gear 77 descends along the grooves 72a of the dehydrating shaft 72. The inner teeth 77a of the descended connecting gear 77 mesh with the outer teeth 81a of the coupling gear 81. In this state, when power is applied to the driving motor 90 so as to rotate the rotor 92 at a high speed, the laundering shaft 71 and the connecting gear 77 meshing with the coupling gear 81 also rotate at a high speed, thereby rotating the dehydrating shaft 72 at a high speed.

By this operation, the rotating blade assembly 53 and the rotating drum 52 rotate at a high speed such that the water retained in the laundry is squeezed out by the centrifugal force and drained through the drain hose 54.

When the motor stops, electrical power is applied to the motor such that a reversed magnetic flux can be generated in the coil 95 and, thus, a reversed electromagnetic force can be generated in the rotor 93. Therefore, the motor generates a reverse rotational force such that the rotating speed of the rotor 92 is rapidly reduced and consequently stopped. The operation is controlled by a control portion of the washing machine.

Figure 5:
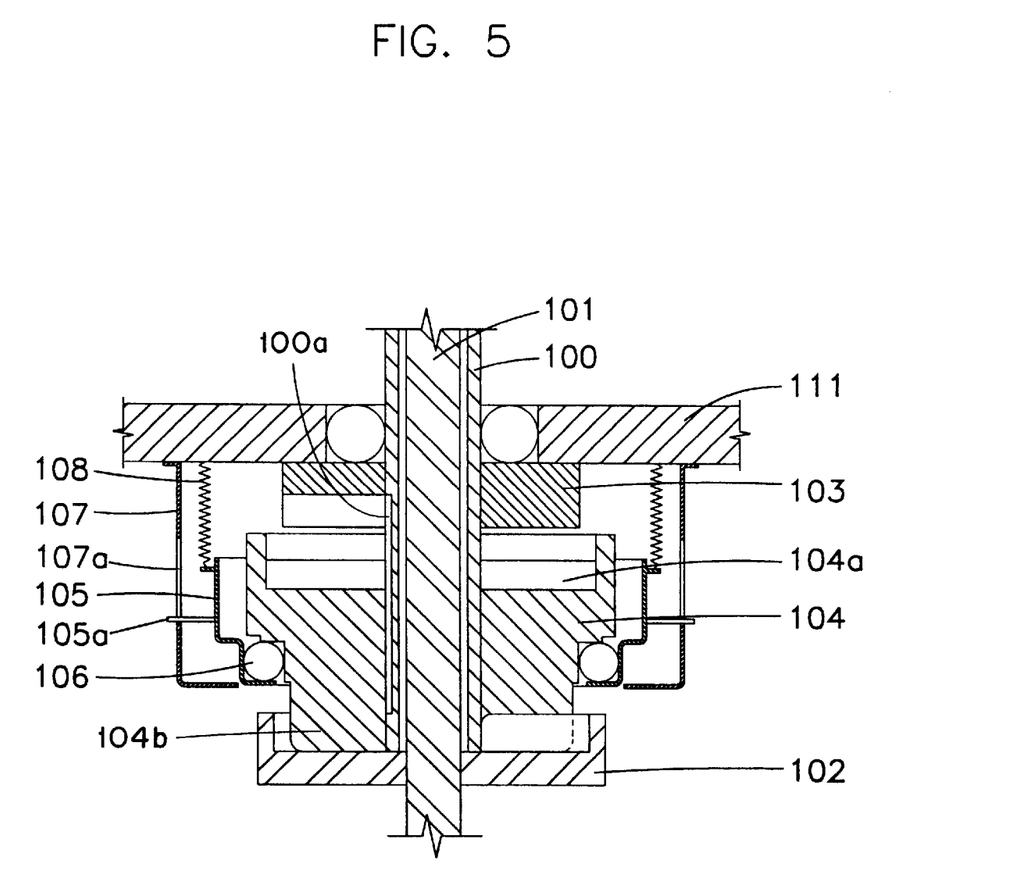
FIG. 5 is a vertical sectional view illustrating a power system according to a second preferred embodiment.

Referring to FIG. 5, there is shown a sectional view of a power system according to a second embodiment of the present invention.

As shown in the drawing, a laundering shaft 101 is inserted in a hollow shaft of a hollow dehydrating shaft 100. A coupling gear 102 is integrally mounted on a lower end of the laundering shaft 101. A fixing gear 103 is mounted on a lower surface of a water reserving drum or tub 111. A vertically movable connecting gear having upper and lower teeth 104a and 104b divided by a stepped portion is disposed between the fixing gear 103 and the coupling gear 102. The lower teeth 104b of the connecting gear 104 mesh with the coupling gear after descending, and mesh with the fixing gear 103 after ascending. An ascending/descending ring 105 is coupled on the stepped portion of the connecting gear 104 by means of bearing 106 interposed between the ascending/descending ring 105 and the connecting gear 104. The ascending/descending ring 105 is provided with two ascending/descending projections 105a which extend into guide slots 107a formed on a cylindrical guide member 107. The projections 105a extending into the slots 107a are designed to be moved downward in response to the application of an external force. A spring 108 is disposed between the upper end of each of the projections 105a and the lower end of the water reserving drum 11, thereby raising the connecting gear 104 by elastic force of the springs 108 when the outer force is released and making the connecting gear 104 mesh with the fixing gear 103.

The connecting gear 104 is provided with a projection formed on an inner circumference and inserted into a groove 100a formed on an outer circumference of the dehydrating shaft 100. A bearing 110 is disposed between the dehydrating shaft 100 and the water reserving drum 11.

In the above described second embodiment, the operations are performed as follows.

For the dehydrating operation, when an external force is applied to the ascending/descending projections 105a, the connecting gear 104 moves downward and is engaged with the coupling gear 102, thereby causing the dehydrating and laundering shafts 100 and 101 to be rotated together.

For the washing and rinsing, when the external force being applied to the ascending/descending projections 105 is released, the connecting gear 104 ascends by the biasing force of the springs 108 and is engaged with the fixing gear 103 such that the dehydrating shaft 100 does not rotate but only the laundering shaft 101 rotates.

While the invention has been described in connection with what is presently considered to be most practical and preferred embodiments, it is to be understood that the invention is not limited to the disclosed embodiments, but, on the contrary, it is intended to cover various modifications and equivalent arrangements included within the spirit and scope of appended claims.

What is claimed is:

1. A clothes washing machine comprising:

a water tub;

a spin basket mounted in the water tub for rotation relative thereto about a vertical axis;

an agitator mounted in the spin basket for rotation about the axis;

a motor disposed beneath the water tub; and a drive transmitting mechanism for transmitting rotation between the agitator and spin basket comprising:

a hollow vertical dehydrating shaft having an upper end connected to the spin basket for rotation therewith;

a laundering shaft extending within the dehydrating shaft, an upper end of the laundering shaft operably connected to the agitator for rotation therewith, a lower end of the laundering shaft operably connected to the motor to be driven thereby about the axis;

a stationary fixing element fixed to the spin basket;

a coupling member operably connected to the motor to be driven thereby;

a connecting member mounted on the dehydrating shaft for common rotation therewith and for vertical movement relative thereto between upper and lower positions, the connecting member including first engagement means connectible with the fixing element when the connecting member is in the upper position, for preventing rotation of the dehydrating shaft and the spin basket, the connecting member including second engagement means connectible with the coupling member when the connecting member is in the lower position to interconnect the connecting member and the coupling member for rotation and thereby enable the motor to rotate the dehydrating shaft and the laundering shaft together; and an elevating mechanism for raising and lowering the connecting member between the upper and lower positions.

2. The clothes washing machine according to claim 1 wherein the connecting member comprises a gear having first and second sets of teeth connectible to respective teeth on the fixing element and coupling member, respectively.

3. The clothes washing machine according to claim 2 wherein the dehydrating shaft includes a longitudinal groove in its outer periphery, the connecting gear including a projection slidable within the groove.

4. The clothes washing machine according to claim 1 wherein the elevating mechanism comprises a ring on which the connecting member is supported, the ring including outward projections, a plurality of slits fixed to the water tub and inclined with respect to vertical and horizontal, the projections being slidable within the slits to cause the ring and connecting member to move vertically in response to rotation of the ring, and means for rotating the ring.

5. The clothes washing machine according to claim 4 wherein the elevating mechanism further includes a bearing disposed between the ring and connecting member to permit relative rotation therebetween.

6. The clothes washing machine according to claim 4 wherein the means for rotating the ring comprises a gear connected to the ring, the gear including holes through which the projections extend.

7. The clothes washing machine according to claim 1 wherein the elevating mechanism comprises a ring on which the connecting member is supported, the ring being biased upwardly by a spring force.

* * * * *